(12) United States Patent
Saito

(10) Patent No.: US 6,198,746 B1
(45) Date of Patent: Mar. 6, 2001

(54) DATA TRANSMISSION SYSTEM IN WHICH CELL RETRANSMISSION CAN BE AVOIDED

(75) Inventor: Takashi Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/056,965

(22) Filed: Apr. 8, 1998

(30) Foreign Application Priority Data

Apr. 17, 1997 (JP) ................................................. 9-099500

(51) Int. Cl.⁷ ................................................... H04L 12/56
(52) U.S. Cl. ............................................... 370/398; 370/474
(58) Field of Search ................................... 370/394, 395, 370/396, 398, 400, 412, 415, 417, 428, 429, 465, 466, 467, 468, 469, 470, 471, 473, 474

(56) References Cited

U.S. PATENT DOCUMENTS

| | | | |
|---|---|---|---|
| 5,062,106 | 10/1991 | Yamazaki et al. | 370/94.1 |
| 5,173,897 | 12/1992 | Schrodi et al. | 370/60 |
| 5,241,536 | 8/1993 | Grimble et al. | 370/60.1 |
| 5,253,248 | 10/1993 | Dravida et al. | 370/16 |
| 5,255,265 | 10/1993 | Eng et al. | 370/60 |
| 5,375,121 | * 12/1994 | Nishino et al. | 370/473 |
| 5,528,590 | * 6/1996 | Iidaka et al. | 370/395 |
| 5,535,221 | * 7/1996 | Hijikata et al. | 714/708 |
| 5,764,641 | * 6/1998 | Lin | 370/412 |
| 5,790,544 | * 8/1998 | Aho et al. | 370/395 |
| 5,930,265 | * 7/1999 | Duault et al. | 370/473 |

FOREIGN PATENT DOCUMENTS

| | | |
|---|---|---|
| 4-372245 | 12/1992 | (JP) . |
| 6-121001 | 4/1994 | (JP) . |
| 7-87099 | 3/1995 | (JP) . |
| 7-250082 | 9/1995 | (JP) . |
| 8-46629 | 2/1996 | (JP) . |
| 8-116326 | 5/1996 | (JP) . |
| 8-186571 | 7/1996 | (JP) . |
| 8-237282 | 9/1996 | (JP) . |

* cited by examiner

*Primary Examiner*—Wellington Chin
*Assistant Examiner*—Kwang B. Yao
(74) *Attorney, Agent, or Firm*—Ostrolenk, Faber, Gerb & Soffen, LLP (57) ABSTRACT

In a data transmission system connected to a communication network, a packet disassembling section disassembls a data packet into non-final cells with a predetermined data length for a cell stream, and adds a final cell after the non-final cells for the cell stream. A cell transmitting section sequentially transmits the non-final cells and a plurality of the final cells to the communication network as the cell stream.

24 Claims, 5 Drawing Sheets

Fig.1

Fig. 2A PACKET

CRC CALCULATION
PAD ADJUSTMENT

Fig. 2B CPCS-PDU

PACKET DISASSEMBLY

Fig. 2C SAR-PDU

ADDITION OF HEADER

Fig. 2D ATM CELL

EOP CELL

Fig. 2E PROCESSING IN EOP CELL COPYING SECTION

COPY

Fig. 2F CELL STREAM TRANSMITTED TO NETWORK

CELL STREAM RECEIVED FROM NETWORK

Fig. 4B ATM CELL

REMOVE HEADER

Fig. 4C SAR-PDU

ASSEMBLY OF PACKET

Fig. 4D CPCS-PDU

CHECK CRC AND PACKET LENGTH

Fig. 4E PACKET

DISCARD BECAUSE OF CRC ERROR AND PACKET LENGTH ERROR

Fig.5

DATA TRANSMISSION SYSTEM IN WHICH CELL RETRANSMISSION CAN BE AVOIDED

BACKGROUND OF THE INVENTION

1. Field of the Invention

The present invention relates to a data transmission system, and more particularly to a data transmission system in which cell retransmission can be avoided when a packet is divided into a plurality of cells in an ATM adaptation layer (AAL) of an ATM (asynchronous transfer mode) communications system.

2. Description of the Related Art

The technique on the loss detection control system of an ATM cell is disclosed in Japanese Laid Open Patent Disclosure (JP-A-Heisei 8-186571: a first conventional example). In this loss detection control system, when an EOP (End Of Packet) cell which is the last cell does not arrive for a predetermined time of period, the EOP cell is determined to have been lost. Thus, the cell loss can be detected in a shorter time period, compared with the case where cell loss is detected by an upper level application. Also, the invalid suspension by a buffer memory for the assembly of cells can be prevented.

Also, the technique on a cell discard control system is disclosed in Japanese Laid Open Patent Disclosure (JP-A-Heisei 4-372245: a second conventional example). In this cell discard control system, when a cell of a data packet is discarded, the discard of the other cells of the data packet is variably controlled, considering the service class. Thus, efficient communication is made possible in accordance with an upper level application.

However, in the above-mentioned conventional examples, only the case which the discard of a cell has occurred is considered. It is not solved at all to reduce the possibility of the discard of cell. This is because the problems such as the short detection time of cell discard and the influence to the upper level layer due to the cell discard are only considering.

In addition, a cell retransmission control system is described in Japanese Laid Open Patent Disclosure (JP-A-Heisei 6-121001). In the cell retransmission control system, a procedure of cell retransmission in an AAL (ATM Adaptation Layer) is simplified to avoid retransmission of an unnecessary cell.

In Japanese Laid Open Patent Disclosure (JP-A-Heisei 7-250082), there is described an AAL type 1 processing unit in which any delay time is not generated even if a phase proceeding is generated due to switching and underflow is not generated even if a phase delay is generated due to the switching.

Also, in Japanese Laid Open Patent Disclosure (JP-A-Heisei 8-116326), there is described a cell assembling unit in which a delay buffer section outputs a cell to a payload accumulating section with a delay time during which the cell is analyzed such that the cell assembling unit can be constructed with a small size.

Also, in Japanese Laid Open Patent Disclosure (JP-A-Heisei 7-87099), an error control method is described in which reliable data communication is made possible with high through-put and low latency in an AAL type 5.

Also, in Japanese Laid Open Patent Disclosure (JP-A-Heisei 8-46629), an ATM network interface module is described in which throughput in an upper layer can be improved by adding hardware of as a small quantity as possible.

Also, in Japanese Laid Open Patent Disclosure (JP-A-Heisei 8-237282), a congestion control system in a packet communication system is described in which data such as the number of accumulated ATM cells and the number of discarded ATM cells are monitored to see a buffer state and whether an ATM cell should be discarded is determined based on such data.

SUMMARY OF THE INVENTION

The present invention is accomplished in view of the above-mentioned problems. Therefore, an object of the present invention is to provide a data transmission system in which it can be avoided that a packet is discarded due to loss or discard of an EOP cell.

Another object of the present invention is to provide a data transmission system in which traffic increase in a transmission network due to retransmission of a packet and complicated control for the retransmission of the packet can be avoided when an EOP cell is discarded or lost.

In order to achieve an aspect of the present invention, a data transmission system connected to a communication network, includes a packet disassembling section for disassembling a data packet into non-final cells with a predetermined data length for a cell stream, and for adding a final cell after the non-final cells for the cell stream, and a cell transmitting section for sequentially transmitting the non-final cells and a plurality of the final cells to the communication network as the cell stream.

The cell transmitting section may include a transmitting section for transmitting the cell stream to the communication network, a distinguishing section for distinguishing the final cell, and for supplying the non-final cells to the transmitting section, and a copy generating section for generating a copy of the final cell. Here, the transmitting section sequentially transmits the non-final cells and a plurality of the copies of the final cell to the communication network as the cell stream.

In this case, the copy generating section may include a memory for storing the copy of the final cell, and a copying section for generating the copy of the final cell to store in the memory. Here, the transmitting section reads the copy of the final cell from the memory plural times after having transmitted the non-final cells, and transmits the read copies of the final cell to the communication network.

In the data transmission system of the present invention, the communication network may be an ATM (asynchronous transfer mode) communication network, and the cells may be ATM cells, and the final cell may be an EOP (end of packet) cell.

In order to achieve another aspect of the present invention, a data transmission system connected to a communication network, includes a packet disassembling section for disassembling a data packet into non-final cells with a predetermined data length for a cell stream, and for adding a final cell after the non-final cells for the cell stream, and a cell transmitting for sequentially transmitting the non-final cells and a plurality of the final cells to the communication network as the cell stream, when the data packet has a data length longer than a predetermined length.

The cell transmitting section may include a transmitting section for transmitting the cell stream to the communication network, a determining section for determining whether the data packet is longer than the predetermined length, a distinguishing section for distinguishing the final cell, and for supplying the non-final cells to the transmitting section when it is determined by the determining section that the data packet has a data length longer than a predetermined length, and a copy generating section for generating a copy of the final cell, when the transmitting section sequentially transmits the non-final cells and a plurality of the copies of the final cell to the communication network as the cell stream.

In this case, it is desirable that the distinguishing section supplies the non-final cells and the final cell to the transmitting section when it is determined by the determining section that the data packet has a data length shorter than a predetermined length. Here, the transmitting section sequentially transmits the non-final cells and the final cell to the communication network as the cell stream.

Alternatively, the copy generating section may include a memory for storing the copy of the final cell, and a copying section for generating the copy of the final cell to store in the memory. Here, the transmitting section reads the copy of the final cell from the memory plural times after having transmitted the non-final cells, and transmits the read copies of the final cell to the communication network.

In the data transmission system of the present invention, the communication network may be an ATM (asynchronous transfer mode) communication network, and the cells may be ATM cells, and the final cell may be an EOP (end of packet) cell.

In order to achieve still another aspect of the present invention, a method of transmitting a data packet between first and second units through a communication network, includes the steps of:

disassembling a data packet into non-final cells with a predetermined data length for a cell stream in the first unit;

adding a final cell after the non-final cells in the first unit;

sequentially transmitting the non-final cells and a plurality of the final cells as a cell stream to the second unit through the communication network; and assembling the data packet from the non-final cells in the second unit.

DESCRIPTION OF THE PREFERRED EMBODIMENTS

A data transmission system of the present invention will be described below in detail with reference the attachment drawings.

Figure 1:
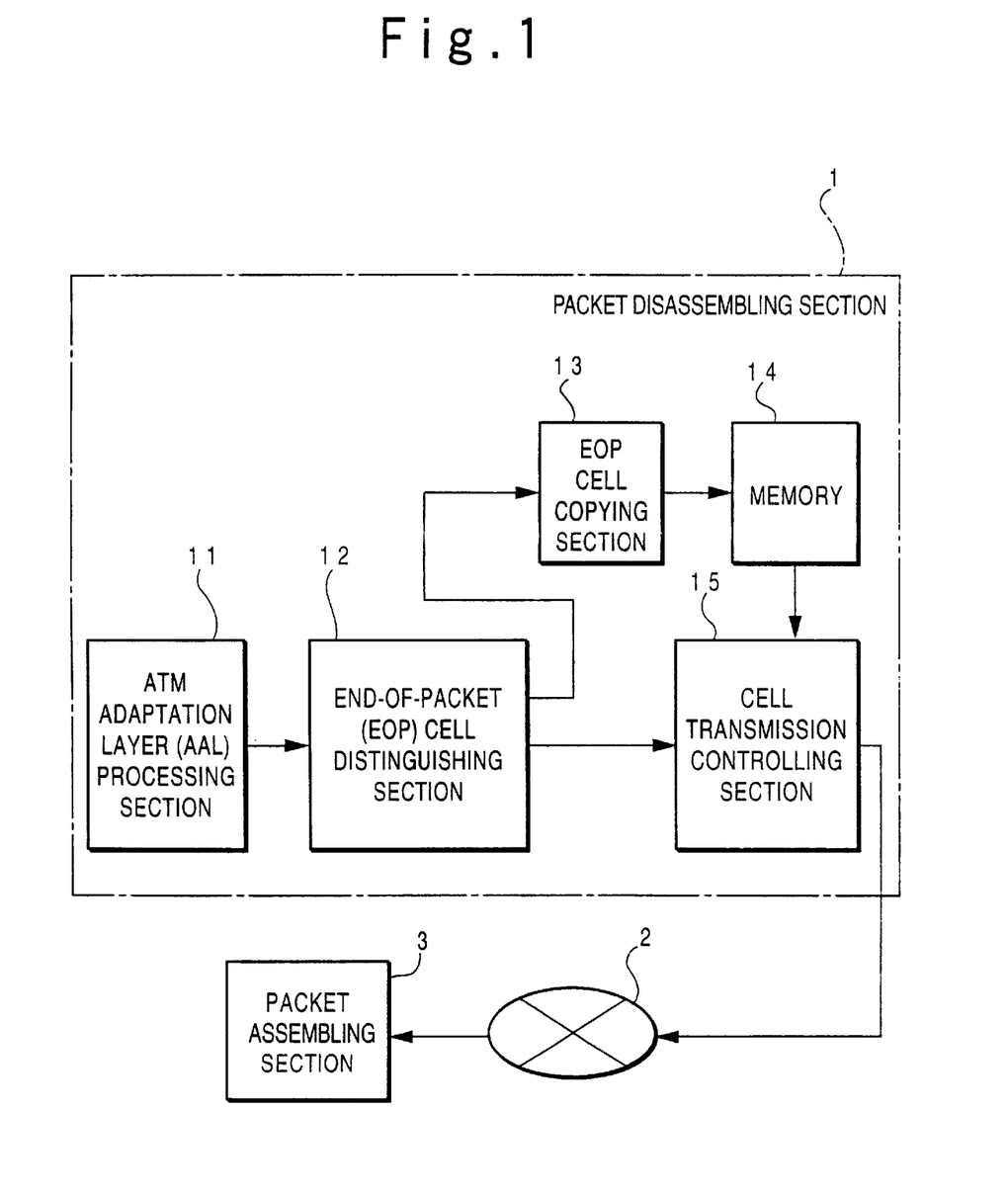
FIG. 1 is a block diagram illustrating the structure of a data transmission system according to a first embodiment of the present invention.

FIG. 1 is a block diagram illustrating the structure of the data transmission system according to the first embodiment of the present invention. Referring to FIG. 1, the data transmission system is comprised of a packet transmission unit 1 as a packet disassembling section, a communication network 2 and a packet reception unit 3 as a packet assembling section.

The packet disassembling section 1 disassembles a data packet into a plurality of ATM cells with a predetermined data length and sends the plurality of ATM cells together with a plurality of EOP (end of packet) cells to the transmission network 2. The packet assembling section 3 receives the plurality of ATM cells and the EOP cells from the packet disassembling section 1 through the communication network 2 to assemble a data packet of the received ATM cells and the EOP cell.

The packet disassembling section 1 is composed of an AAL (ATM Adaptation Layer) processing section 11, an EOP (End of Packet) cell distinguishing section 12, an EOP cell copying section 13, a memory 14 and a cell transmission controlling section 15.

The AAL processing section 11 has a function to disassemble a data packet into a plurality of ATM cells with a predetermined data length in accordance with a predetermined rule and to add an EOP cell which is the last cell of a cell stream to the ATM cells. The ATM cells and the EOP cell are sent from the AAL processing section 11 to the EOP cell distinguishing section 12.

The EOP cell distinguishing section 12 distinguishes the EOP cell from the cells sent from the AAL processing section 11 to supply to the EOP cell copying section 13 with no condition. The EOP cell copying section 13 produces a copy of the EOP cell and stores the copy of the EOP cell in the memory 14.

The cell transmission controlling section 15 sequentially transmits the ATM cells other than the EOP cell supplied from the EOP cell distinguishing section 12 to the communication network 2 as a part of a cell stream. Then, the cell transmission controlling section 15 reads the copy of the EOP cell from the memory 14, and generates duplicate copies for transmission to the communication network 2 one after another to complete the cell stream. The manner in which the number of copies to be transmitted is described below.

FIGS. 2A to 2F show a packet disassembly process in the packet disassembling section 1 of FIG. 1. A data packet to be transmitted is disassembled into the ATM cells in the AAL processing section 11. This may be performed, for example, according to the AAL type 5 protocol which is based on recommendations I.362 and I.363 by ITU-T.

Figure 2A:
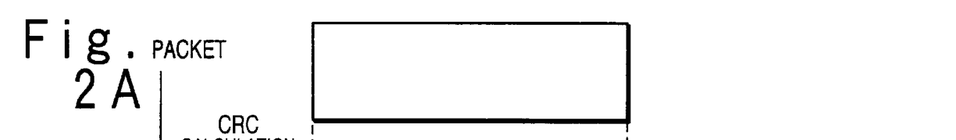
FIGS. 2A to 2F are diagrams illustrating a packet disassembly process in the first embodiment of the present invention.
Figure 2B:
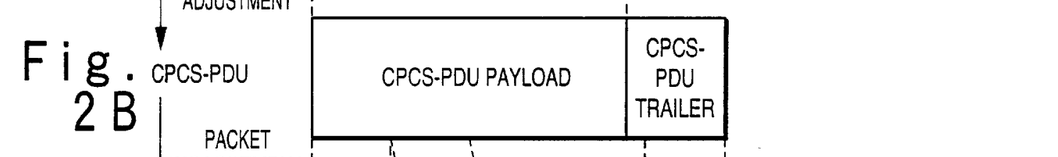

According to the AAL type 5 protocol, a variable byte-length pad and an 8 byte trailer are added to the incoming packet to create a Common Part Convergence Sublayer-Protocol Data Unit (CPCS-PDU) as shown in FIG. 2B. The number of bytes in the pad are selected to assure that the byte length of the resulting CPCS-PDU is a multiple of 48 (the byte length of the standard ATM cell payload). The trailer includes the packet length and the so-called "32-bit cyclic redundancy check".

Figure 2C:
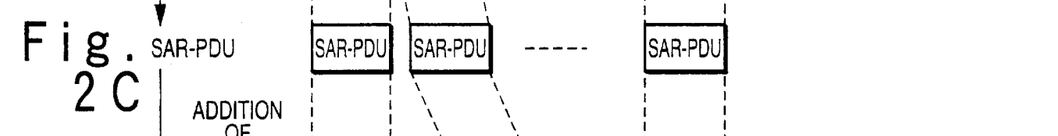
Figure 2D:
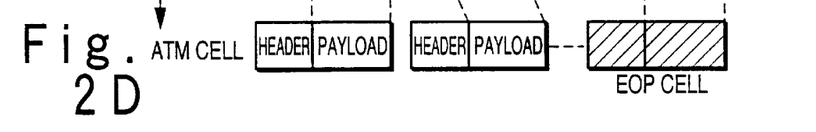
Figure 2E:
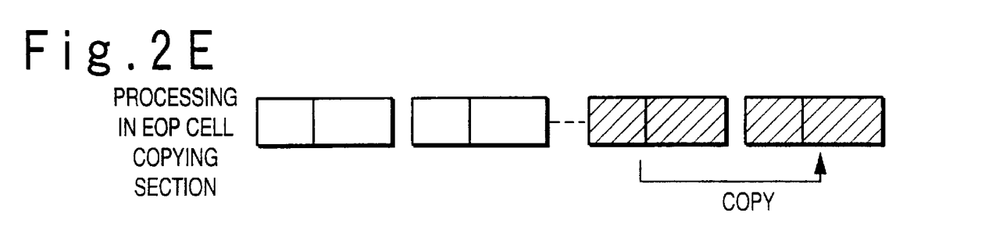
Figure 2F:
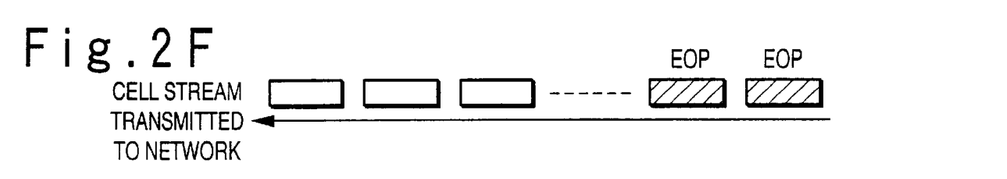

Then, the CPCS-PDU (including the trailer) is segmented into 48-byte Segmentation and Reassembly (SAR) PDU's as shown in FIG. 2C, and the 48-byte segments are placed in the payload field of a series of ATM cells with standard 5-byte headers to create the completed cells as shown in FIG. 2D. The Packet Type (PT) field of the headers contains data which distinguish the last or end of packet (EOP) cell from the remaining cells.

After the EOP cell is created, it is supplied to the header is added, the EOP cell is supplied to the EOP cell copying section 13 which produces a copy of EOP cell to store in the memory 14.

The cell transmission controlling section 15 transmits the ATM cells other than the EOP cell supplied from the cell distinguishing section 12 to the communication network 2. Then, the cell transmission controlling section 15 reads out the copy of EOP cell from the memory 14. As will be recalled, the payload for the EOP cell, which was derived from the standard CPCS-PDU trailer, contains information as to the total packet length. Based on this information, for example, cell transmission controlling section 15 creates a number of copies of the EOP cell equal to the number of ATM cells, and transmits these immediately following the ATM cells. For the example shown in FIGS. 2A–2F, there are two ATM cells in the packet, and therefore two EOP cells (see FIGS. 2E–2F).

Figure 3A:
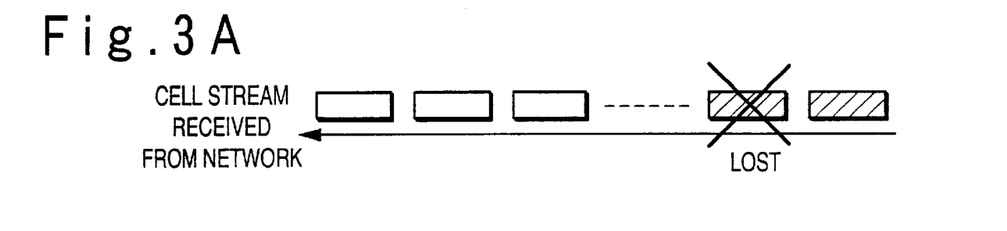
FIGS. 3A to 3E are diagrams illustrating a packet assembly process in the first embodiment of the present invention.
Figure 3B:
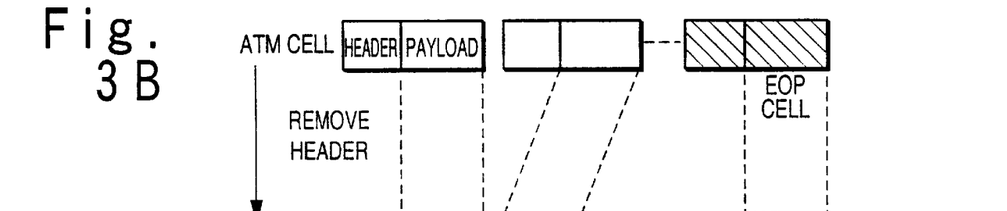

FIGS. 3A to 3E are diagrams illustrating an example of packet assembly process in the packet assembling section 3 in which a data packet is assembled from the cell stream transmitted from the packet disassembling section 1 through the communication network 2. In this example, as shown in FIG. 3A, the case is shown where the first one of the two EOP cells which have been continuously transmitted has been lost in transmission or discarded in a relay unit (not shown).

Figures 3C, 3D:
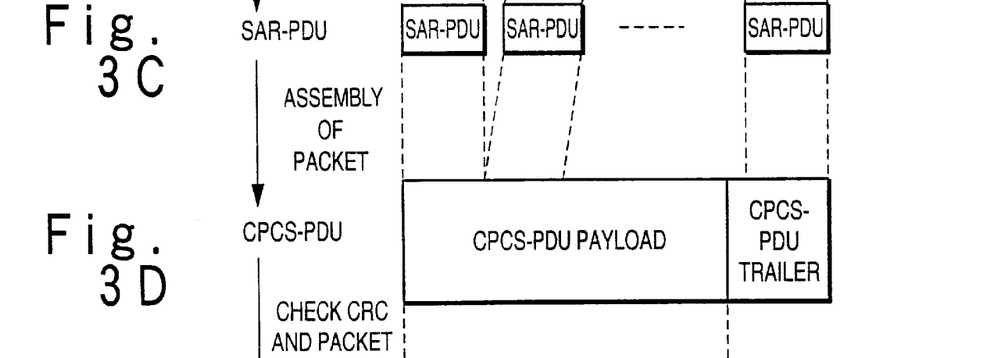
Figure 3E:
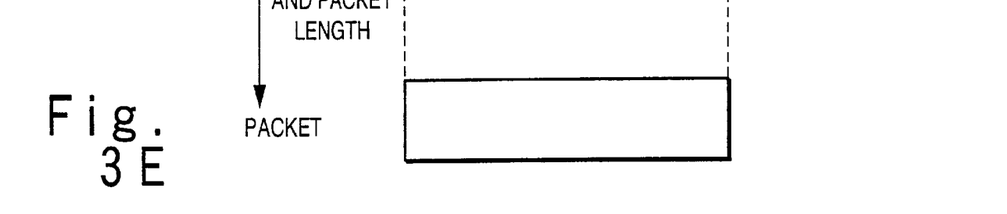

In this case, since the second one of the two EOP cells remains which has been not lost or discarded, it is possible to assemble the data packet using the remaining EOP cell. That is, as shown in FIG. 3C, the header is removed from each of the ATM cells in the stream shown in FIG. 3B to produce a series of SAR-PDU's. A CPCS-PDU payload is assembled from the SAR-PDUs as shown in FIG. 3D and the data packet is generated from the CPCS-PDU, as shown in FIG. 3E. At this time, a CRC check is performed to the CPCS-PDU payload based on the trailer of the CPCS-PDU. Also, a check is performed to confirm that the the byte-length CPCS-PDU including the PAD region is a multiple of 48 bytes. Thereafter, the packet is assembled from the ATM cell stream.

Figure 4A:
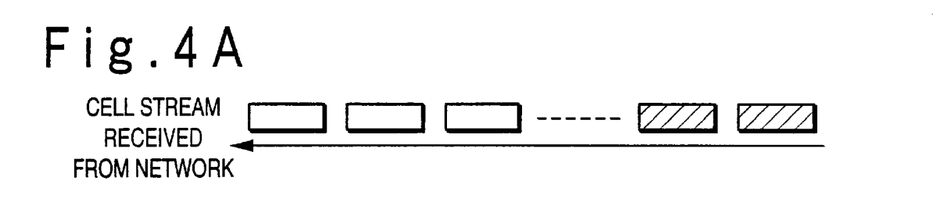
FIGS. 4A to 4E are diagrams illustrating another example of the packet assembly process in the first embodiment of the present invention.

FIGS. 4A to 4E are diagrams illustrating another example of packet assembly process in the packet assembling section 3 which receives the cell stream transmitted from the packet disassembling section 1 through the communication network 2, as shown in FIG. 4A. In this example, the case is shown where neither of the EOP cells are lost on the transmission path or discarded in a relay unit (not shown). Even in this case, it is shown that the data packet can be assembled from the ATM cell stream when a conventional packet assembling process is used.

Figure 4B:
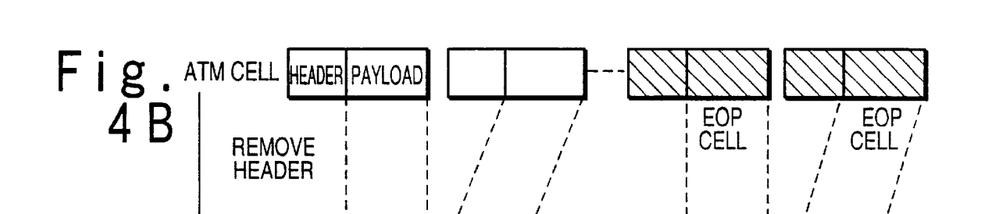
Figures 4C, 4D:
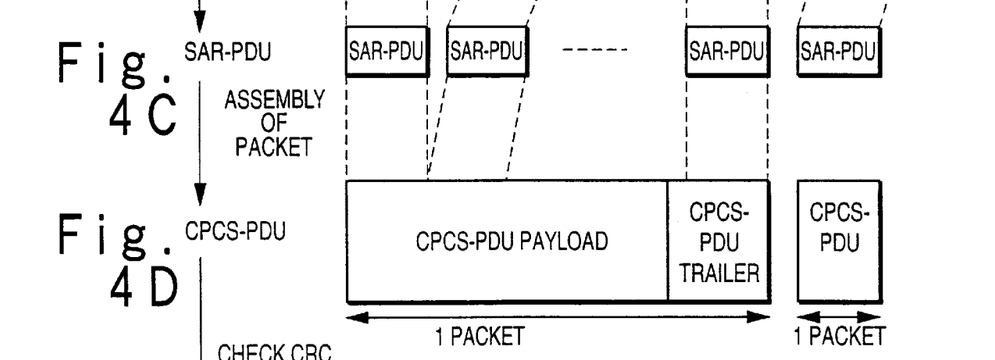
Figure 4E:
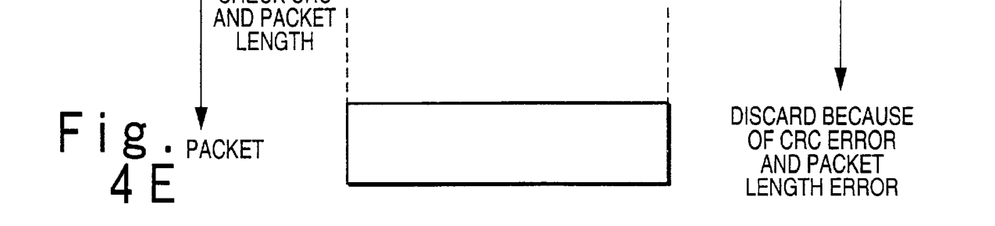

When the header is removed from each of the ATM cells to generate an SAR-PDU, it is recognized through a usual packet assembly process that there are two packets, because the two EOP cells exist in the ATM stream, as shown in FIG. 4B. A CPCS-PDU is generated from the corresponding one of the SAR-PDUs for the cells other than the second one of the two EOP cells and a data packet of CPCS-PDU payload with the CPCS-PDU trailer is assembled from the respective CPCS-PDUs. At this time, a CRC 32 check processing error and a packet length incorrect error are detected from the second one of the two EOP cells in the CPCS-PDU. Therefore, the second one of the EOP cells is discarded.

One normal packet is formed through the above-mentioned packet assembling process. There is no case where a packet is erroneously assembled. In this manner, as the packet assembling section 3 shown in FIG. 1, an existing packet assembling section 1 can be used just as it is, as described above. In accordance with, the packet disassembling section 1 can be connected to an ATM data transmission system.

Figure 5:
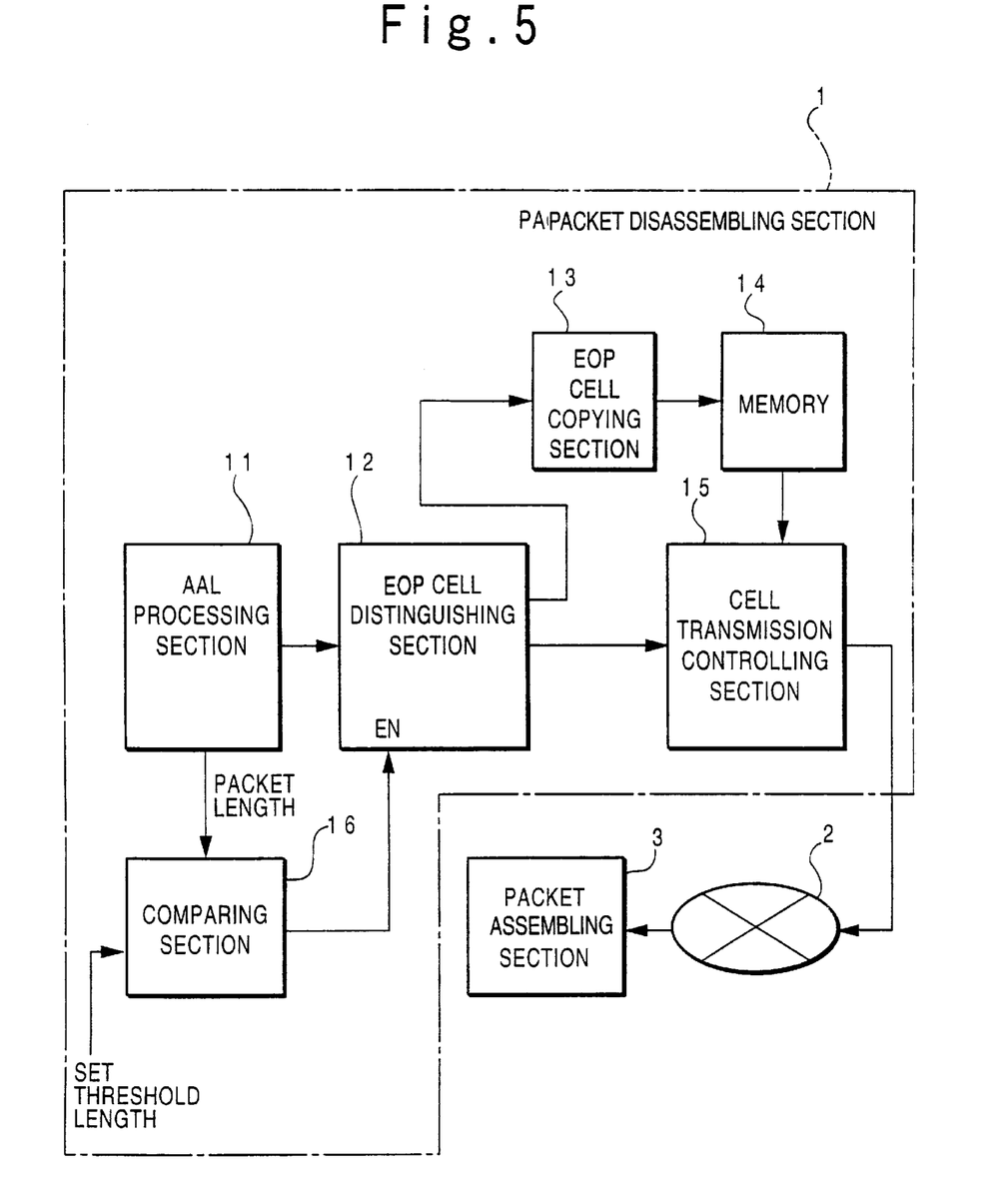
FIG. 5 is a block diagram illustrating the structure of a data transmission system according to a second embodiment of the present invention.

FIG. 5 is a block diagram illustrating the structure of the packet disassembling section 1 according to the second embodiment of the present invention, and the same components as in FIG. 1 are assigned with the same reference numerals. In FIG. 5, a comparing section 16 is added to the structure of the packet disassembling section 1 shown in FIG. 1 to compare the packet length with a threshold value.

The comparing section 16 compares the length of the packet supplied from the AAL processing section 11 with a predetermined threshold value. The comparing section 16 allows the EOP cell distinguishing section 12 to supply the EOP cell to the EOP cell copying section 13 when determining that the packet length is larger than the predetermined threshold value. Otherwise, the comparing section 16 inhibits the EOP cell distinguishing section 12 to supply the EOP cell to the EOP cell copying section 13. Thus, it is possible to prevent a lot of EOP cells from being transmitted onto the communication network.

As described above, according to the data transmission system of the present invention, a plurality of EOP cells, one of which is required to assemble the packet, are continuously transmitted. Therefore, even if one or more of the continuously transmitted EOP cells is lost or discarded, the packet can be assembled if anyone of the EOP cells remains. In this manner, the packet discard due to cell loss or cell discard can be avoided.

Also, according to the present invention, a copy of EOP cell may be produced when the packet has the packet length longer than a predetermined value. Therefore, it is possible to prevent extra copies of EOP cell from increasing on the communication network so that the bandwidth is wasted.

Further, according to the present invention, even if a copy of EOP cell is transmitted, the existing packet assembling process can be used just as it is. Therefore, the data transmission system of the present invention can be connected to the existing ATM cell transmission system with such a packet assembling process. It is not necessary to reconstruct the ATM cell transmission system.

What is claimed is:

1. A data transmission system connected to a communication network, comprising:

a first circuit section which converts an incoming variable length data packet into a data stream comprised of a succession of non-final data segments and a final data segment, each of which has a predetermined equal data length; and a second circuit section which identifies the final data segment in the data stream, generates a reference copy of the final data segment, generates one or more additional copies of the final data segment from the reference copy as a function of the data length of the incoming data packet, transmits the succession of non-final data segments to the communication network, and transmits the generated copies of the final data segment to the communication network after the succession of non-final data segments to complete the data stream.

2. The data transmission system described in claim 1, wherein the second circuit section includes:

a copy generating circuit which generates the reference copy of the final data segment; and a memory for storing the reference copy of the final data segment; and wherein the second circuit section is operative to read the reference copy of the final data segment from the memory a plurality of times as a function of the data length of the incoming data packet and to transmit the read copies of the final data segment to the communication network.

3. The data transmission system described in claim 1, wherein the second circuit section includes:
   a third circuit section which determines the data length of the incoming data packet; and
   wherein the second circuit section is responsive to an output of the third circuit section to reproduce the reference copy of the final data segment a plurality of times as a function of the data length of the incoming data packet and to transmit the reproduced copies of the final data segment to the communication network if the data length of the incoming data packet exceeds the threshold value, and to transmit a single final data segment to the communication network if the data length of the incoming data packet does not exceed the threshold value.

4. The data transmission system described in claim 3, wherein the second circuit section includes:
   a memory for storing the reference copy of the final data segment generated by the fifth circuit section; and
   wherein the second circuit section is responsive to the output of the third circuit section to read the reference copy of the final data segment from the memory a plurality of times as a function of the data length of the incoming data packet and to transmit the read copies of the final data segment to the communication network if the data length of the incoming data packet exceeds the threshold value.

5. A data transmission system connected to a communication network, comprising:
   a packet disassembling section which disassembles an incoming data packet into a succession of non-final cells having a predetermined data length to form a data stream, which generates a final cell, and appends the final cell to the data stream following the last non-final cell;
   a circuit section which identifies the final cell and generates a reference copy thereof,
   a cell transmitting control section which generates one or more copies of the reference final cell, which transmits the succession of non-final cells to the communication network, and which transmits the generated copies of the final cell to the communication network after the succession of non-final cells to complete the data stream.

6. The data transmission system described in claim 5, wherein the transmitting control section further includes:
   a memory for storing the reference copy of the final cell generated by the circuit section; and
   wherein the transmitting control section is operative to read the copy of the final cell from the memory a plurality of times and to transmit the read copies of the final cell to the communication network.

7. The data transmission system described in claim 5, wherein the number of copies of the reference final cell read is a function of the data length of the incoming data packet.

8. The data transmission system described in claim 7, wherein the cell transmitting control section is operative to generate a plurality of copies of the final cells as a function of the data length of the incoming data packet when the data length exceeds a predetermined threshold value, and to transmit only a single final cell to the communication network when the data length of the incoming data packet does not exceed the predetermined threshold value.

9. A data transmission system connected to a communication network, comprising:

a packet disassembling section which disassembles an incoming data packet into a succession of non-final cells having a predetermined data length as a data stream, generates a final cell, and appends the final cell to the data stream following the last non-final cell;
   a cell transmitting control section which generates one or more copies of the final cell, transmits the succession of non-final cells to the communication network, and transmits the generated copies of the final cell to the communication network after the succession of non-final cells to complete the data stream when the data length of the incoming data packet exceeds a predetermined value.

10. The data transmission system described in claim 9, wherein the cell transmitting control section includes:
    a transmitting circuit which transmits the data stream to the communication network;
    a first circuit section which determines the data length of the data packet;
    a second circuit section responsive the an output of the first circuit section which identifies a final cell and supplies the final cell to the transmitting circuit when the output of the first circuit section indicates that the data length of the data packet does not exceed a predetermined value; and
    a copy generating circuit which generates a reference copy of the final cell; and
    wherein the second circuit section is operative to generate one or more copies of the reference copy of the final cell, and to transmit the succession of non-final cells and the generated copies of the final cell to the communication network when the output of the first circuit section indicates that the data length of the data packet exceeds predetermined value.

11. The data transmission system described in claim 9, further including:
    a copy generating circuit which generates a reference copy of the final cell; and
    a memory which stores the reference copy of the final cell; and
    wherein the cell transmitting control section is operative to read the copy of the final cell from the memory a plurality of times and to transmit the succession of non-final cells and the copies of the final cell read from the memory to the communication network when the data length of the incoming data packet exceeds the predetermined value.

12. The data transmission system described in claim 11, wherein the number of copies of the reference final cell read is a function of the data length of the incoming data packet when the data length exceeds the predetermined threshold value, and wherein only a single final cell is transmitted to the communication network when the data length of the incoming data packet does not exceed the predetermined threshold value.

13. A data transmission system which transmits a variable length data packet over a communication network in the form a data stream of ATM cells, and which reduces the need for data retransmission, the system comprising:
    an AAL section which converts a variable length data packet into a stream of fixed data length ATM cells, the data stream including a succession of non-final cells and a final cell;
    a first circuit which distinguishes the final cell from the non-final cells;

a copying circuit which generates a reference copy of the final cell; and a transmission controlling section which transmits the succession of non-final cells to the communication network, which generates one or more transmission copies of the final cell from the reference copy as a function of the data length of the data packet, and which transmits the transmission copies of the final cell to the communication network after the succession of non-final cells.

14. The data transmission system described in claim 13, further including:

a second circuit which determines if the data length of the incoming data packet exceeds a predetermined threshold value; and wherein the transmission controlling section is responsive to an output of the second circuit to reproduce the reference copy of the final data segment a plurality of times as a function of the data length of the incoming data packet and to transmit the reproduced copies of the final data segment to the communication network if the output of the second circuit indicates that the data length of the incoming data packet exceeds the threshold value, and to transmit a single final data segment to the communication network if the output of the second circuit indicates that the data length of the incoming data packet does not exceed the threshold value.

15. A method of transmitting a variable length data packet between a first and a second communication unit through a communication network, comprising:

in the first communication unit;
converting the data packet into a data stream comprised of a succession of non-final data segments and a final data segment, each having a predetermined equal data length,
identifying the final data segment in the data stream,
generating a reference copy of the final data segment,
generating one or more additional copies of the final data segment,
appending the additional copies of the final data segment to the succession of non-final data segments to complete the data stream;
transmitting the data stream to the second communication unit over the communication network; and
at the second communication unit;
reassembling the data packet from the data stream received over the communication network.

16. The data transmission method described in claim 15, further including the steps of:

determining if the data length of the incoming data packet exceeds the predetermined threshold value; and;

if the data length of the incoming data packet exceeds the threshold value, reproducing the reference copy of the final data segment a plurality of times as a function of the data length of the incoming data packet, and transmitting the reproduced copies of the final data segment to the communication network, or transmitting a single final data segment to the communication network if the data length of the incoming data packet does not exceed the threshold value.

17. The data transmission method described in claim 15, wherein the number of additional copies of the reference final data segment generated is a function of the data length of the data packet.

18. A method of transmitting a data packet between a first and a second communication unit through a communication network, comprising:

in the first communication unit;
disassembling the data packet into a data stream comprised of a succession of non-final cells and a final cell, each having a predetermined equal data length,
identifying the final cell in the data stream,
generating a reference copy of the final cell,
generating one or more additional copies of the final cell from the reference copy,
appending the additional copies of the final cell to the succession of non-final cells to complete the data stream;
transmitting the data stream to the second communication unit over the communication network; and
at the second communication unit;
reassembling the data packet from the data stream received over the communication network.

19. The data transmission system described in claim 18, further including the steps of:

storing a copy of the final cell in a memory;
reading the copy of the final cell from the memory a plurality of times; and
transmitting the read copies of the final cell to the communication network.

20. The data transmission method described in claim 18, wherein the number of additional copies of the reference final cell generated is a function of the data length of the data packet.

21. The data transmission method described in claim 18, wherein the number of final cells transmitted to the communication network is a function of data length of the incoming data packet when the data length exceeds a predetermined threshold value, and wherein only a single final cell is transmitted to the communication network when the data length of the data packet does not exceed the predetermined threshold value.

22. A method of transmitting a variable length data packet over an ATM communication network, which reduces the need for data retransmission, the method comprising the steps of:

converting the data packet into a stream of fixed data length ATM cells, the data stream including a succession of non-final cells and a final cell;
distinguishing the final cell from the non-final cells;
generating a reference copy of the final cell;
transmitting the succession of non-final cells to the communication network;
generating one or more transmission copies of the final cell from the reference copy; and
transmitting the transmission copies of the final cell to the communication network after the succession of non-final cells.

23. The method as described in claim 22, wherein the number of transmission copies generated is a function of the data length of the data packet.

24. The method as described in claim 22, further including the step of:

determining the data length of the data packet; and
wherein the number of copies of the final cell which are transmitted is a function of the data length of the data packet when the data length exceeds a predetermined threshold, and only a single copy of the final cell is transmitted when the data length does not exceed the predetermined threshold.

* * * * *